United States Patent [19]
Karass

[11] Patent Number: 5,028,174
[45] Date of Patent: Jul. 2, 1991

[54] APPARATUS FOR TRANSPORTING BOTTLES

[75] Inventor: Hans J. Karass, Dortmund, Fed. Rep. of Germany

[73] Assignee: Holstein und Kappert Aktiengesellschaft, Dortmund, Fed. Rep. of Germany

[21] Appl. No.: 359,358

[22] Filed: May 31, 1989

[30] Foreign Application Priority Data

Jun. 1, 1988 [DE] Fed. Rep. of Germany ... 8807146[U]

[51] Int. Cl.$^5$ ...................... B65G 53/16; B65G 53/38
[52] U.S. Cl. ........................................ 406/88; 406/86
[58] Field of Search .................................. 406/86, 88

[56] References Cited
U.S. PATENT DOCUMENTS

4,724,035 2/1988 Mann et al. ........................... 406/86

FOREIGN PATENT DOCUMENTS

2580609 10/1986 France .................................. 406/86

*Primary Examiner*—Joseph F. Peters, Jr.
*Assistant Examiner*—Anne E. Bidwell
*Attorney, Agent, or Firm*—Toren, McGeady & Associates

[57] ABSTRACT

An apparatus for transporting plastic bottles which have a support collar near the opening. The bottles are suspended by the support collars on a guide track. Compressed air nozzle ducts are arranged on both sides of the bottles underneath the support collars. The air nozzle ducts have a nozzle surface in which at least one row of compressed air nozzles directed in the direction of movement of the bottles are arranged. At least one additional row of nozzles is provided whose effective direction of flow is obliquely and/or perpendicularly upwardly.

3 Claims, 1 Drawing Sheet

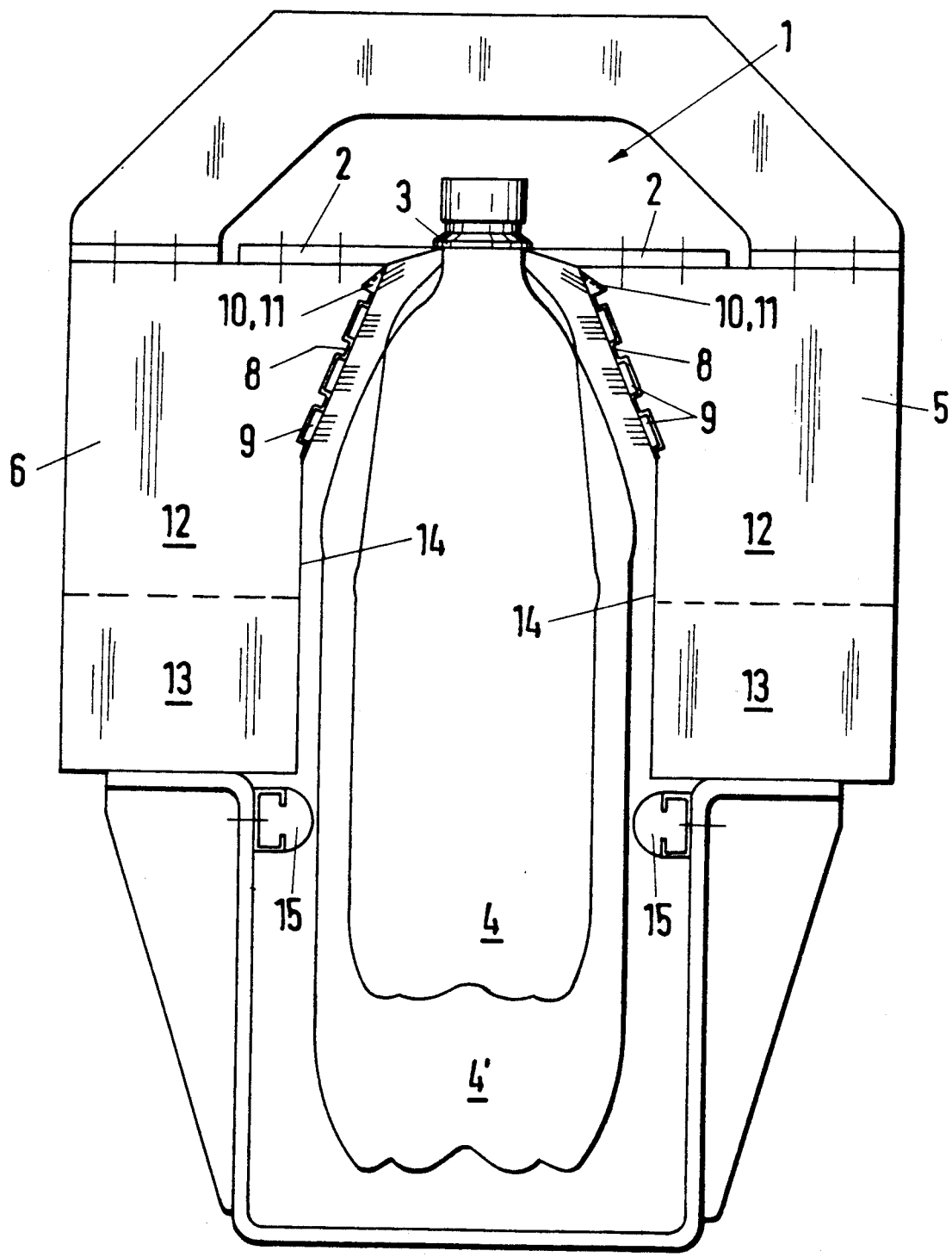

APPARATUS FOR TRANSPORTING BOTTLES

BACKGROUND OF THE INVENTION

1. Field of the Invention

The present invention relates to an apparatus for transporting bottles. The invention relates particularly to an apparatus for transporting plastic bottles which have a support collar near the opening, wherein the bottles are suspended by the support collars on a guide track. The apparatus further includes compressed air nozzle ducts which are arranged on both sides of the bottles underneath the support collar thereof.

2. Description of the Related Art

Apparatus of the above-described type are used particularly for the rapid transportation of lightweight plastic bottles between an area where the bottles are stored and subsequent treatment machines. Such conveying apparatus include a guide track and a compressed air nozzle duct which is arranged immediately adjacent the guide track and is directed toward the region of the opening of the bottles to be transported. The compressed air is conducted directly against the region of the opening and shoulder of the bottles to be transported and, thus, the area of attack on the bottles is relatively small, so that a strong air flow is required for moving the individual bottles. On the other hand, with the arrangement of the air nozzles immediately in the area of the bottle openings, particularly in plants of the beverage industry, the danger of an infection of the bottle contents placed in the bottles subsequently cannot be excluded. This may result in substantial problems, particularly in the case of sensitive beverages which are subsequently filled into the bottles in a bottling machine.

It has also been suggested to arrange the guide track above and spaced from a compressed air nozzle duct each arranged on both sides of the travel path of the bottles, wherein the nozzle ducts have a distance from each other which is substantially greater than the diameter of the bottles to be transported, and wherein guide rails are arranged underneath the nozzle ducts for limiting the lateral path of movement of the bottles.

The latter prior art proposal discussed above results in substantial improvements of the first prior art apparatus discussed above. In particular, it is now possible to process different bottles of any size with the same apparatus without a direct flow of air onto the region of the opening of the bottles and the attendant danger of infection during the subsequent filling of the bottles.

The latter apparatus has the disadvantage that the nozzles are located relatively far away from the actual support surfaces or sliding planes of the support collars of the bottles and, thus, the low area of attack of the air flow on the bottle frequently results in a tilting of the bottles during transport. As a consequence, tilted bottles must be freed many times in order to facilitate the further transport of all subsequent bottles. Another disadvantage of this apparatus is the fact that particularly single bottles which are kept at a distance from the preceding or subsequent row in the transport path are subject to tilting particularly quickly and, therefore, automatically result in the impairment of the subsequent bottles.

It is, therefore, the primary object of the present invention to provide an apparatus for transporting bottles of the above-described type in which the disadvantages mentioned above are avoided. Particularly, a tilting of the bottles is to be eliminated without impairing desired biological requirements.

SUMMARY OF THE INVENTION

In accordance with the present invention, the compressed air nozzle ducts each have a surface in which the nozzles are arranged, the surface being inclined essentially corresponding to the bottle shoulder near the opening of the bottle, wherein the compressed air nozzle ducts have one and/or more nozzles which open in the direction of movement of the bottles, and wherein at least one additional row of nozzles is provided whose effective direction of flow is oblique and/or perpendicularly upwardly.

The apparatus according to the present invention makes it possible to have the air flow conducted to the bottles at an optimum location without resulting in a significant loss of the compressed air flow to be applied. Moreover, the suspension of the bottles in the guide track is reinforced from below by the additional row of nozzles which are essentially directed upwardly. Accordingly, the bottles are essentially supported on an air cushion, so that a lower flow capacity for the actual transport is required on the one hand, and tilting of individual bottles is prevented, on the other.

The various features of novelty which characterize the invention are pointed out with particularity in the claims annexed to and forming a part of this disclosure. For a better understanding of the invention, its operating advantages and specific objects attained by its use, reference should be had to the drawing and descriptive matter in which there is illustrated and described a preferred embodiment of the invention.

BRIEF DESCRIPTION OF THE DRAWING

In the drawing:

The single figure of the drawing is a schematic sectional view of the apparatus according to the present invention.

DESCRIPTION OF THE PREFERRED EMBODIMENT

As illustrated in the drawing, the apparatus for transporting bottles includes a guide track 1 which advantageously is formed by two continuous plastic rails 2 which are arranged spaced apart from each other and serve to receive a support collar 3 of plastic bottles 4. Compressed air nozzles 5, 6 are arranged underneath and spaced from the plastic rails 2. The compressed air nozzle ducts 5, 6 are arranged spaced apart from each other on opposite sides of the travel path of the plastic bottles 4.

The compressed air nozzle ducts 5, 6 include nozzle surfaces 8 which extend obliquely and essentially adapted to the shoulders of the bottles. Nozzle surfaces 8 have one or more nozzles 9 which open in the direction of movement of the bottles. The nozzles 9 are arranged in a row one behind the other. It is possible to provide several rows of nozzles one behind the other.

In addition to the nozzles 9 which extend and act in the direction of movement of the bottles, another row 10 of nozzles 11 is arranged spaced from the nozzles 9. The nozzles 11 are directed obliquely upwardly. The number of nozzles 11 may be smaller in each row 10 than the number of nozzles in the other rows which are provided for the actual transport of the plastic bottles 4.

The nozzles 9 are mounted on a wall facing the plastic bottles 4, i.e., the nozzle surface 8, which is part of a nozzle chamber 12. The nozzle chamber 12 is in communication with a compressed air supply chamber 13 which is located below nozzle chamber 12 and which is advantageously fed by a common compressed air blower or the like.

Opposite side walls 14 of the compressed air chambers 12 have suitable guide rails 15 which substantially prevent any tilting of the bottles 4 transversely of the transport direction.

The guide track 1 on which the support collars 3 of the plastic bottles 4 rest or slide is replaceably mounted in U-shaped rails 16 on the compressed air nozzle ducts and may be, for example, made of slidable plastic or the like.

The bottles 4 to be transported are supplied from a storage area to the guide track and are further transported by the air flow emerging from the nozzles 9 directed in the direction of movement of the bottles. The additional upper row 10 of nozzles 11 serves to slightly lift the support collar 3 of each bottle 4 from the guide track 1 and, thus, makes possible a practically problem-free sliding of the collar even over a long distance. This is true even when only a single bottle is being transported, so that the above-described tilting of the bottles can be avoided.

While a specific embodiment of the invention has been shown and described in detail to illustrate the application of the inventive principles, it will be understood that the invention may be embodied otherwise without departing from such principles.

I claim:

1. An apparatus for transporting bottles, wherein each bottle has an opening, a shoulder and a support collar near the opening, the apparatus comprising spaced apart rails forming a guide track for suspending the bottles by the support collars, and compresses air nozzle ducts which are arranged on both sides of the bottles underneath the support collars, the compressed air nozzle ducts each having a nozzle surface in which at least one row of compressed air nozzles are arranged, each nozzle surface being inclined essentially corresponding to the bottle shoulder near the opening of the bottle, the compressed air nozzles being directed in the direction of movement of the bottles, wherein at least one additional upper row of nozzles is provided, the nozzles of the upper row of nozzles being directed so as to provide an obliquely upwardly directed flow.

2. The apparatus according to claim 1, wherein the number of nozzles in the additional upper row of nozzles is smaller than the number of nozzles in the at least one row of nozzles which are directed in the direction of movement of the bottles.

3. The apparatus according to claim 1, wherein the guide track is of a slidable plastics material and is replaceably mounted on the compressed air nozzle duct.

* * * * *